United States Patent
Honkanen et al.

(10) Patent No.: US 10,183,839 B2
(45) Date of Patent: Jan. 22, 2019

(54) METHOD FOR MANUFACTURING A FLEXIBLE COMPOSITE BELT OR CABLE

(71) Applicant: EXEL COMPOSITES OYJ, Mäntyharju (FI)

(72) Inventors: Juha Honkanen, Joensuu (FI); Kim Sjödahl, Vantaa (FI); Vesa Korpimies, Vantaa (FI)

(73) Assignee: Exel Composites Oyj, Vantaa (FI)

( * ) Notice: Subject to any disclaimer, the term of this patent is extended or adjusted under 35 U.S.C. 154(b) by 299 days.

(21) Appl. No.: 14/772,926

(22) PCT Filed: Mar. 10, 2014

(86) PCT No.: PCT/FI2014/050176
§ 371 (c)(1),
(2) Date: Sep. 4, 2015

(87) PCT Pub. No.: WO2014/140424
PCT Pub. Date: Sep. 18, 2014

(65) Prior Publication Data
US 2016/0016757 A1 Jan. 21, 2016

(30) Foreign Application Priority Data
Mar. 11, 2013 (FI) ...................... 20135234

(51) Int. Cl.
*B66B 7/06* (2006.01)
*D07B 1/16* (2006.01)
(Continued)

(52) U.S. Cl.
CPC ............ *B66B 7/062* (2013.01); *B29C 47/025* (2013.01); *B29C 70/525* (2013.01);
(Continued)

(58) Field of Classification Search
CPC .. B66B 7/062; D07B 2201/2016; D07B 1/22; D07B 7/145; D07B 2201/2046;
(Continued)

(56) References Cited

U.S. PATENT DOCUMENTS

| 4,624,097 A | 11/1986 | Wilcox |
| 8,632,651 B1 * | 1/2014 | Hicks .................... B29C 66/028 156/272.2 |

(Continued)

FOREIGN PATENT DOCUMENTS

| CN | 104924640 A | 9/2015 |
| DE | 0152 510 | 12/1981 |

(Continued)

OTHER PUBLICATIONS

Translated DD 0152510.*
(Continued)

*Primary Examiner* — Vishal I Patel
(74) *Attorney, Agent, or Firm* — Ladas & Parry LLP

(57) ABSTRACT

A method for manufacturing a flexible composite belt or cable, in the method, one or more parallel reinforced plastic profiles (11) are manufactured by pultrusion, continuous lamination or other continuous method. After surface treatment, the reinforced plastic profiles (11) are guided at a short distance from one another to coating treatment, which is carried out by extrusion or lamination or pultrusion. In the coating treatment, the reinforced plastic profiles are enveloped with a coating material (12) improving wear resistance which joins the reinforced plastic profiles (11) together and forms the coating of a finished belt or cable (10). Finally, the finished belt or cable (10) is wound on a reel.

14 Claims, 3 Drawing Sheets

(51) Int. Cl.
*D07B 7/14* (2006.01)
*B29C 47/02* (2006.01)
*B29C 70/52* (2006.01)
*B29C 70/86* (2006.01)
*D07B 1/02* (2006.01)
*D07B 1/22* (2006.01)
*B29K 101/12* (2006.01)
*B29K 105/12* (2006.01)
*B29K 307/04* (2006.01)
*B29K 309/08* (2006.01)
*B29L 9/00* (2006.01)
*B29L 11/00* (2006.01)
*B29L 31/34* (2006.01)
*D07B 1/14* (2006.01)

(52) U.S. Cl.
CPC .............. *B29C 70/865* (2013.01); *D07B 1/02* (2013.01); *D07B 1/16* (2013.01); *D07B 1/162* (2013.01); *D07B 7/145* (2013.01); *B29K 2101/12* (2013.01); *B29K 2105/12* (2013.01); *B29K 2307/04* (2013.01); *B29K 2309/08* (2013.01); *B29K 2995/0077* (2013.01); *B29K 2995/0086* (2013.01); *B29L 2009/005* (2013.01); *B29L 2011/0075* (2013.01); *B29L 2031/3462* (2013.01); *D07B 1/145* (2013.01); *D07B 1/22* (2013.01); *D07B 2201/2016* (2013.01); *D07B 2201/2033* (2013.01); *D07B 2201/2046* (2013.01); *D07B 2201/2087* (2013.01); *D07B 2201/2088* (2013.01); *D07B 2205/3003* (2013.01); *D07B 2205/3007* (2013.01); *D07B 2501/2007* (2013.01)

(58) Field of Classification Search
CPC .. D07B 2501/2007; D07B 1/02; D07B 1/145; D07B 1/16; D07B 2201/2033; D07B 2201/2087; D07B 2201/2088; D07B 2205/3003; D07B 2205/3007; D07B 1/162; D07B 2801/10; B29K 2307/04; B29K 2995/0086; B29K 2995/0077; B29K 2309/08; B29K 2105/12; B29K 2101/12; B29C 47/025; B29C 70/525; B29C 70/865; B29L 2011/0075; B29L 2009/005; B29L 2031/3462

See application file for complete search history.

(56) References Cited

U.S. PATENT DOCUMENTS

| | | | |
|---|---|---|---|
| 2002/0000346 A1* | 1/2002 | Baranda | B66B 7/06 187/254 |
| 2002/0150752 A1 | 10/2002 | Debalme et al. | |
| 2010/0032081 A1* | 2/2010 | Green | B29C 47/0014 156/219 |
| 2011/0000746 A1* | 1/2011 | Pelto-Huikko | B66B 7/062 187/254 |
| 2012/0195733 A1 | 8/2012 | Bruch et al. | |
| 2012/0297746 A1* | 11/2012 | Chou | D07B 1/02 57/230 |

FOREIGN PATENT DOCUMENTS

| | | |
|---|---|---|
| DE | 38 1338 A1 | 11/1989 |
| DE | 102011005323 A1 | 9/2012 |
| DE | 102011005329 A1 | 9/2012 |
| EP | 3 009 390 A1 | 4/2016 |
| FI | 122261 B | 11/2011 |
| JP | 2001-302135 A | 10/2001 |
| WO | 2006/001702 A1 | 1/2006 |
| WO | 2009/026730 A1 | 3/2009 |
| WO | 2010/048736 A2 | 5/2010 |
| WO | 2011/148033 A1 | 12/2011 |
| WO | 2013/140038 A1 | 9/2013 |

OTHER PUBLICATIONS

Machine translation of DE 38 13 338 A1.*
English_Abstract_of_DE102011005323A1.
English_Abstract_of_DE102011005329A1.
English_Abstract_of_JP2001302135A.
English_Abstract_of_WO2010048736A2.
FI Search Report dated Dec. 23, 2013.
Search Report dated Sep. 23, 2016 for Application No. EP 14 76 2499.
Espacenet English abstract of DE 38 1338 A1.
espacenet English abstract of CN 104924640 A.

* cited by examiner

METHOD FOR MANUFACTURING A FLEXIBLE COMPOSITE BELT OR CABLE

CROSS-REFERENCE TO RELATED APPLICATION

This application is a 371 of International Application PCT/FI2014/050176 filed 10 Mar. 2014, which claims priority from FI Application No. 20135234 filed on 11 Mar. 2013, the disclosures of which are incorporated in their entirety by reference herein.

The invention relates to a method for the continuous manufacture of a flexible composite belt or cable by pultrusion or by a continuous lamination process.

The products manufactured according to the method of the invention can be utilised in various applications where, for example, steel cable has been previously used. Applications include, for example, the cables of elevators and other lifting equipment, or the cables of conveyor lifts, load-bearing cables and the power transmission solutions, such as belts, of various machines and equipment. The patent publication FI-122261 discloses examples of elevator cables which can be manufactured with the method according to the invention.

The advantages of the belts or cables manufactured by the method according to the invention are that they are lightweight, non-slipping, have high tensile strength and fatigue strength, are non-creeping and properly controllable. The aim of the invention is to provide a method applicable to both online and offline production, by means of which flexible composite belts or cables can be manufactured economically and with high quality.

The accompanying claim 1 shows an online and offline production method and claim 2 shows an online production method. The main difference between these is that in offline production (claim 3), the product is wound on a reel after the pultrusion stage, on which the intermediate stage products, that is, the reinforced plastic profiles are temporarily stored before the next coating treatment.

The method according to the invention is illustrated in the following, with reference to the accompanying drawings, in which.

Figure 1:
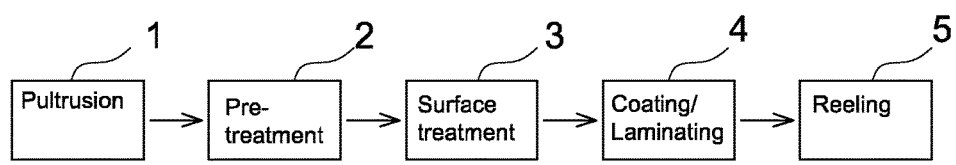
FIG. 1 shows diagrammatically the method stages of the continuous online method.

In the embodiment of FIG. 1, several parallel reinforced plastic profiles 11 are first manufactured simultaneously by pultrusion or continuous lamination (stage 1). At the pre-treatment stage 2, the surface of the reinforced plastic profiles is pretreated before the actual surface treatment 3. Alternative and/or parallel or successive surface treatment methods include plasma treatment, corona treatment, flaming, vacuum-cleaning, wet washing, brushing, grinding, sandblasting, grain blasting, chemical treatment with a strong acid or alkali and adhesive treatment. The surface may also be primed with different adhesion-promoting chemicals. The purpose of the surface treatment is to improve adhesion between the pultrusion product, that is, the reinforced plastic profiles, and the coating material. With plasma treatment, the reinforced plastic surface can be cleaned, activated and treated chemically. Plasma cleaning can be used in a known and efficient manner, for example, for removing grease. The function of plasma treatment may also be to remove dirt, dust or other contaminants. By plasma activation, the surface energy of reinforced plastic can be reduced, thus facilitating adhesion. By plasma treatment, the surface molecules of reinforced plastic can be broken and adhesion can thus be facilitated chemically or mechanically. Corona treatment also facilitates adhesion by reducing the surface energy of a substrate. The flaming method may consist of a gas flame or a plasma flame. Flaming can be used to reduce the surface energy of a substrate and its function may also be to remove grease or other contaminants and dirt. When carried out in several stages, the pre-treatment may consist of various stages, in which case the first stage may be a lighter treatment, such as vacuum-cleaning, washing or brushing, which removes coarser impurities. The first stage may also be grinding, sandblasting or grain blasting, which provides a larger area of adhesion or a mechanically better adhesion surface. The function of the above-mentioned methods may also be to clean the surface. Chemical treatment of the surface is preferable if there is a suitable amount of soluble impurities on the surface. The advantage of chemical treatment is that hard mechanical pressure is not required. Furthermore, after these pretreatment stages, or without the said stages, chemical layers (primer) facilitating adhesion can be spread on the surface, which act as intermediate layers, such as glue, or activate the surface of the reinforced plastic, preferably by increasing adhesion.

The reinforced plastic profiles are polymer composite profiles reinforced with continuous fibres. The amount of fibre in a composite is approximately 40-80%. Carbon and/or glass fibres are the fibres typically used. As a polymer may be, for example, polyurethane, epoxy, vinyl ester or polyester. In reinforced plastic profiles, thermosetting plastic or thermoplastic can be used as a matrix. The shape of the reinforced plastic profiles may be a flat bar, bar, pipe, plate, or the like.

Figure 8:
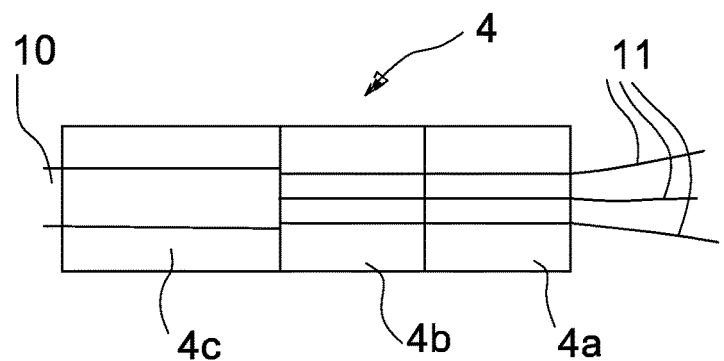
FIG. 8 shows diagrammatically the coating treatment unit.

At the coating stage 4, the reinforced plastic profiles 11 are guided at a short distance from one another to coating treatment which is carried out by extrusion or lamination or pultrusion. FIG. 8 shows a coating treatment unit for carrying out the coating stage 4. A collector 4a collects the reinforced plastic profiles 11 and the control unit 4b guides them, accurately positioned with respect to one another, to the coating unit 4c. As coating material can be used, for example, different elastomeric materials or rubbers, such as PU, TPU or SBS. As coating material can also be used various thermoplastic masses. The purpose of the coating is to improve wear resistance, the friction coefficient, and to protect the structural reinforced plastic part.

Figure 4:
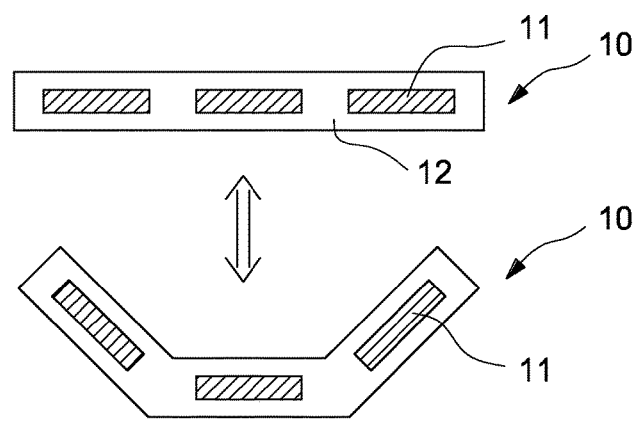
FIG. 4 shows an alternative cross-section of a product which is also transversely flexible.
Figure 5:
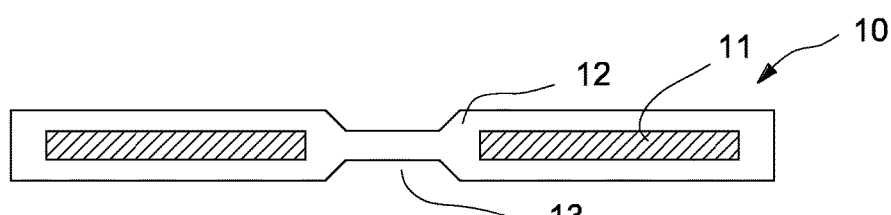
FIG. 5 shows an alternative cross-section of a product which is thinned in the centre to increase flexibility.
Figure 6:
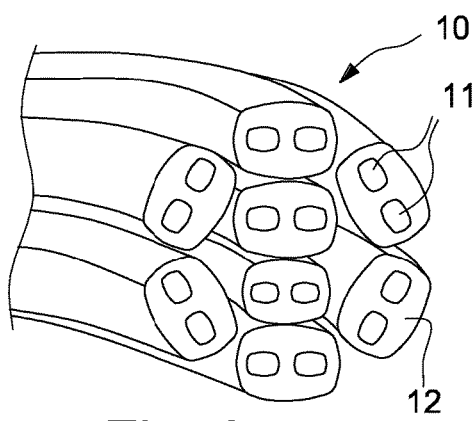
FIGS. 6 and 7 show embodiments of the invention in which the coated profiles form strands of a wire or cable. The reinforced plastic profiles are protected from wear and the shape of the coating can preferably be designed for this purpose.
Figure 7:
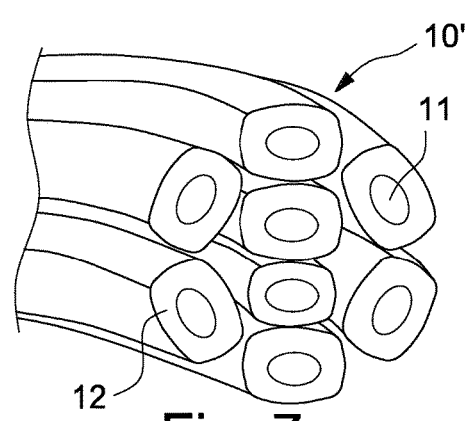

At the coating stage, the product is given its final shape and, if necessary, the coating keeps the composite parts together and thus the coating material is selected according to the application. The coating also makes possible transverse flexibility of the product since the composite reinforcements consist of several separate profiles between which there is a flexible coating. This can be used to facilitate the product to remain, for example, in a wedge groove; FIG. 4. The reinforced plastic profiles can also be positioned in the desired manner inside a casing added at the coating stage. For example, at the extrusion stage, it may be advantageous to leave a sufficient amount of space between the reinforced plastic profiles in order that the final product can be bent transversely and furthermore be straightened flexibly. The coating may also be made thinner at the points marked with reference numeral 13, which facilitates bending.

Layers acting as wear indicators may be added to the product also during coating. An additional layer may be a second coating layer or a reinforcement, such as a reinforced mat or fabric.

Figure 3:
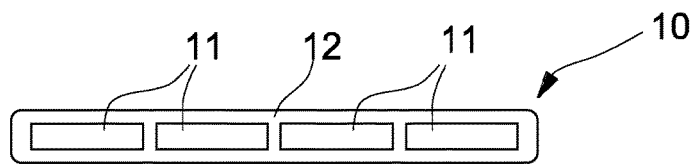
FIG. 3 shows the cross-section of a composite belt or cable manufactured according to the method stages of FIG. 1 or FIG. 2.
Figure 9:
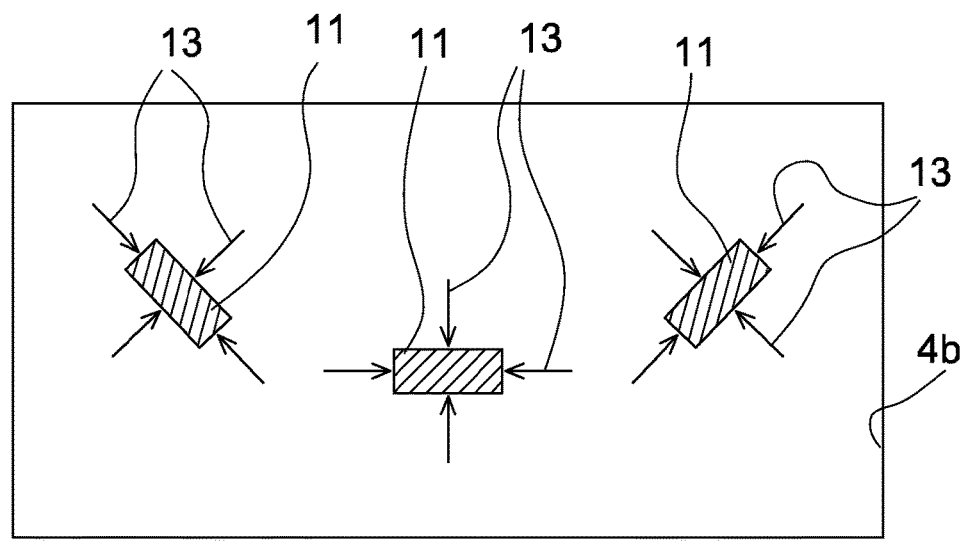
FIG. 9 shows diagrammatically a controller comprised in the coating treatment unit.

When choosing the coating material, it should be taken into account that the coating material 12 also joins the reinforced plastic profiles 11 together, whereby a finished belt or cable 10 with a coating is formed. At the coating/lamination stage 4 are used guides 13 (FIG. 9) which guide the composite profiles to a desired distance (e.g. 1 mm) from one another. As guides 13 may act the sliding surfaces and/or rollers of the guide plate openings, which are movable. By changing the guide plates or rollers, the reinforced plastic profiles can be guided to the desired positions with respect to one another. The number of the composite profiles and the shape of the finished belt or cable may vary as, for example, in the examples of the publication FI 122261. FIG. 3 shows only one example case. The width of a finished product 10 is preferably greater than its thickness, typically at least three times greater.

Finally, the finished belt or cable 10 is wound on a reel at stage 5. The final flat bar type profile can be further processed further by using individual coated profiles as strands which form a wire or cable.

Figure 2:
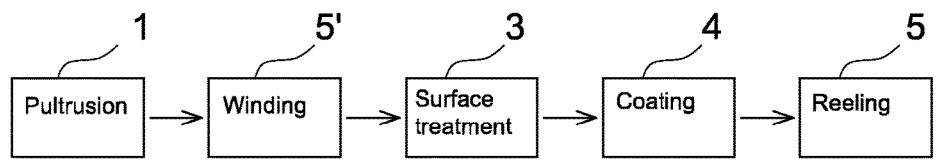
FIG. 2 shows diagrammatically the method stages of the offline method.

The offline production shown in FIG. 2 is otherwise the same as the online production described above, but between the pultrusion stage 1 and the surface treatment 3 is carried out a winding stage 5'. This makes it possible to manufacture reinforced plastic profiles 11 to stock before surface treatment and coating. In this case, the reinforced plastic profiles 11 may also be made one at a time at stage 1, whereby several parallel reinforced plastic profiles can be supplied to the surface treatment and coating stages 3 and 4 simultaneously from several reels.

In the embodiments of FIGS. 1 and 2, the pultrusion stage 1 may be replaced by continuous lamination for manufacturing composite profiles 11.

The invention may be applied as follows.

During the coating treatment 4, a reinforcement is added for improving the properties of the coating material. During the coating treatment 4 is added a cable, an optical fibre or an electroconductive material layer, which add the possibilities for making measurements, for monitoring and analysing the condition, wearing and aging of the composite belt. After the coating treatment 4, the combination can be subjected to surface treatment.

Several composite belts may be gathered together to form a solid multi-strand wire. In connection with the coating treatment, a pattern can be made on the surface, which provides the cable with a mechanical grip on the driving wheels and/or improves visual condition monitoring.

The coating treatment can be made in several layers. The layers may be of different materials or of different hardnesses of the same material (co-extrusion). If so desired, the reinforced plastic profiles may be pretreated, which improves adhesion between the reinforced plastic and the coating.

The reinforced plastic profile is preferably coated with a flexible elastomere, which facilitates transverse flexibility and makes it possible to change the cross-sectional geometry of the product to match the application. Due to the elastic body, the profile may be an opening one or one which folds into shape. The reinforced plastic profiles are guided precisely into the thermoplastic coating, whereby their position in the final product geometry may be adjusted as desired. The method is used to manufacture a carrier cable for an elevator.

A composite profile may be designed in the desired manner and the coating may be applied to only a part of the reinforced profile. Different reinforced profiles may be guided into the coating and they can be positioned as desired in the lateral and perpendicular directions. At the coating stage, a tooth-like wedge surface can be made in the product, which helps the product to stay in the wedge groove.

Pultrusion uses parallel straight reinforced fibres and in the process other reinforcing materials may also be added on the surface of the product.

The invention claimed is:

1. A method for manufacturing a flexible composite belt or rope, the method comprising the stages of:
   manufacturing two or more parallel reinforced plastic profiles by pultrusion
   performing surface treatment on the reinforced plastic profiles by a plasma treatment, which facilitates adhesion between the reinforced plastic and a coating material
   guiding the two or more reinforced plastic profiles to a desired distance from one another joining the two or more reinforced plastic profiles together by enveloping them with the coating material in a coating treatment carried out by extrusion or pultrusion thereby forming the flexible composite belt or rope and
   winding the flexible composite belt or rope on a first reel.

2. The method as claimed in claim 1 wherein the method comprises winding and temporarily storing the two or more parallel reinforced plastic profiles on at least one second reel.

3. The method as claimed in claim 1, wherein the plasma treatment is atmospheric plasma treatment.

4. The method as claimed in claim 1, wherein thermoplastic mass or elastomeric or rubber material is used as the coating material, and the method comprises
   embedding a reinforcement in the coating material during the coating treatment by means of which the properties of the coating material are improved.

5. The method as claimed in claim 1, wherein the method comprises embedding a cable, an optical fibre or an electroconductive material layer, in the coating material.

6. The method as claimed in claim 1, wherein the coating treatment comprises forming a pattern on the surface of the coating, the pattern being configured to improve mechanical grip or ability to monitor visual condition of the flexible composite belt or rope.

7. The method as claimed in claim 1, wherein the method comprises performing the coating treatment by forming several layers wherein the layers are of different materials and/or of different hardnesses of the same material (co-extrusion).

8. The method as claimed in claim 1, wherein the coating treatment comprises pretreating the reinforced plastic profiles before the surface treatment thereby further improving adhesion between the reinforced plastic and the coating.

9. The method as claimed in claim 1, wherein the coating treatment comprises coating the reinforced plastic profiles with flexible elastomeric.

10. The method as claimed in claim 1, wherein the coating treatment comprises guiding the reinforced plastic profiles into a thermoplastic coating adjusting the positions of the reinforced plastic profiles in order to achieve a desired product geometry of the flexible composite belt or rope.

11. The method as claimed in claim 1, wherein the flexible composite belt or rope is a carrier cable for an elevator.

12. The method as claimed in claim 5, wherein the method comprises monitoring condition, wearing or aging of the flexible composite belt or rope by using the cable, optical fibre or electroconductive material layer embedded to the coating material.

13. The method as claimed in claim 9, wherein the enveloping of the two or more reinforced plastic profiles with the coating material comprises forming a coating that has desired transverse flexibility for facilitating a change of cross-sectional profile of the flexible composite belt or rope during use.

14. The method as claimed in claim 13, wherein the flexible composite belt or rope has a foldable cross-sectional profile.

* * * * *